United States Patent
Xu et al.

(10) Patent No.: US 12,403,667 B2
(45) Date of Patent: Sep. 2, 2025

(54) METHOD FOR MANUFACTURING A BULLETPROOF AND EXPLOSIONPROOF TUBELESS TIRE

(71) Applicants: Xuzhou College of Industrial Technology, Jiangsu (CN); Jiangsu Topower Tyre Co., Ltd., Jiangsu (CN)

(72) Inventors: Yunhui Xu, Jiangsu (CN); Peng Sun, Jiangsu (CN); Genchun Liu, Jiangsu (CN); Yanan Zang, Jiangsu (CN); Zaixue Wang, Jiangsu (CN); Peipei Li, Jiangsu (CN); Houluo Cong, Jiangsu (CN); Guiying Zhao, Jiangsu (CN); Feng Liu, Jiangsu (CN); Jiansong Li, Jiangsu (CN)

( * ) Notice: Subject to any disclaimer, the term of this patent is extended or adjusted under 35 U.S.C. 154(b) by 297 days.

(21) Appl. No.: 17/922,690

(22) PCT Filed: Mar. 15, 2022

(86) PCT No.: PCT/CN2022/080932
§ 371 (c)(1),
(2) Date: Nov. 1, 2022

(87) PCT Pub. No.: WO2022/222645
PCT Pub. Date: Oct. 27, 2022

(65) Prior Publication Data
US 2023/0166471 A1    Jun. 1, 2023

(30) Foreign Application Priority Data

Apr. 19, 2021   (CN) .......................... 202110416013.7

(51) Int. Cl.
B29D 30/20      (2006.01)
B60C 9/00       (2006.01)
(Continued)

(52) U.S. Cl.
CPC ............ B29D 30/20 (2013.01); B60C 9/0007 (2013.01); B60C 9/02 (2013.01); B60C 9/20 (2013.01); *B29D 2030/0682* (2013.01)

(58) Field of Classification Search
CPC ........... B60C 9/00; B60C 9/0007; B60C 9/18; B60C 2009/1814; B60C 2009/1871; B29D 30/20; B29D 2030/0682
See application file for complete search history.

(56) References Cited

U.S. PATENT DOCUMENTS

| | | | |
|---|---|---|---|
| 4,895,610 A | 1/1990 | Egan | |
| 2006/0108051 A1* | 5/2006 | Lacagnina | ............. B29D 30/20 156/111 |

(Continued)

FOREIGN PATENT DOCUMENTS

| | | | |
|---|---|---|---|
| CN | 101879842 A | * 11/2010 | ............... B60C 5/00 |
| CN | 206797025 U | 12/2017 | |

(Continued)

*Primary Examiner* — Justin R Fischer
*Assistant Examiner* — Philip N Schwartz

(57) ABSTRACT

The invention discloses a method for manufacturing a bulletproof and explosion-proof tubeless tire, first, the innerliner is attached to the carcass cord ply to make the carcass innerliner, and then the steel wire braided layers and the intermediate rubber layers are laminated to each other to make an explosion-proof layer, using a first stage building machine to complete the first stage forming of the carcass innerliner, explosion-proof layer and belt to obtain a semi-finished embryo, and then using a second stage building machine, the semi-finished embryo and the tread slab base are formed in the second stage to obtain the embryo, which is baked and stored for 8~96 h and then vulcanised to obtain a bulletproof and explosion-proof tire; through the second stage forming process, the invention solves the problem that the explosion-proof layer is difficult to form due to the excessively hard metal material when making the embryo.

7 Claims, 2 Drawing Sheets

(51) Int. Cl.
  *B60C 9/02* (2006.01)
  *B60C 9/20* (2006.01)
  *B29D 30/06* (2006.01)

(56) References Cited

U.S. PATENT DOCUMENTS

| | | | |
|---|---|---|---|
| 2006/0151082 A1 | 7/2006 | De Los Santos | |
| 2012/0234441 A1* | 9/2012 | Mehlem | B60C 1/0016 |
| | | | 523/157 |
| 2023/0035934 A1* | 2/2023 | Colletti | B60C 9/0003 |

FOREIGN PATENT DOCUMENTS

| | | | | |
|---|---|---|---|---|
| CN | 109551794 A | | 4/2019 | |
| CN | 209257794 U | | 8/2019 | |
| CN | 110254137 A | | 9/2019 | |
| CN | 110406323 A | * | 11/2019 | B32B 1/00 |
| CN | 209634191 U | | 11/2019 | |
| CN | 113119663 A | | 7/2021 | |
| JP | 2003312209 A | * | 11/2003 | B60C 9/0007 |
| KR | 101365283 B1 | * | 2/2014 | B29D 30/38 |

* cited by examiner

US 12,403,667 B2

METHOD FOR MANUFACTURING A BULLETPROOF AND EXPLOSIONPROOF TUBELESS TIRE

1. TECHNICAL FIELD

The invention relates to a method for manufacturing a bulletproof and explosion-proof tubeless tire, belonging to the technical field of tire product production.

2. BACKGROUND

At present, the tires of military vehicles such as tanks and armored vehicles, police vehicles, armor cash carriers, vehicles for transporting dangerous materials, bulletproof and explosion-proof special car vehicles and other special vehicles are required to have the performance of ordinary tires, as well as bulletproof and explosion-proof functions, at present, domestic bulletproof and explosion-proof tires are generally designed with a support body in the tubeless tire, after the tire is penetrated by a bullet or deflated by a sharp object, the vehicle can continue to run on the support body for a period of time, not only the speed is slow, but also the weight of the tire is large, the heat generation is large, and the load of the vehicle is increased, in addition, the tire assembly is complicated, and the dynamic balance of the tire is not easy to control; in the tire production process, the use of the explosion-proof layer in the production process is not handled properly.

3. SUMMARY OF THE INVENTION

In order to overcome the above-mentioned shortcomings of the prior art, the invention provides a process manufacturing method for producing tires, through the second stage forming process, steel wire braided layers are added to the tire carcass to prevent bullets and sharp objects from piercing the carcass, which not only plays the role of bulletproof and explosion-proof, but also reduces the difficulty of assembly and ensures the dynamic balance requirements of the tire.

The invention is realized by the following technical scheme, a method for manufacturing a bulletproof and explosion-proof tubeless tire, first, the innerliner is attached to the carcass cord ply to make the carcass innerliner, and then the steel wire skeleton layers and the intermediate rubber layers are laminated to each other to make an explosion-proof layer, using a first stage building machine to complete the first stage forming of the carcass innerliner, explosion-proof layer and belt to obtain a semi-finished embryo, and then using a second stage building machine, the semi-finished embryo and the tread slab base are formed in the second stage to obtain the embryo, which is baked and stored for 8~96 h and then vulcanised to obtain a bulletproof and explosion-proof tire;

the bulletproof and explosion-proof tire is sequentially provided with the innerliner, carcass cord ply, belt and tread slab base from the inside to the outside;

the shoulder of the bulletproof and explosion-proof tire is provided with shoulder wedges;

an explosion-proof layer is arranged between the belt and the carcass cord ply;

the explosion-proof layer consists of a number of steel wire skeleton layers and a number of intermediate rubber layers, both of which are interlaced with each other, and the ends of the explosion-proof layer are all intermediate rubber layers;

the steel wire skeleton layers are steel wire braided layers or steel wire winding layers;

the steel wire braided layer is braided by means of a steel wire braiding machine according to a certain braiding balance angle, the number of steel wire braiding layers is 1~3 layers, and the braiding balance angle is 53~56°;

the steel wire winding layer is woven by a steel wire winding machine according to a certain winding balance angle, the number of steel wire winding layers is 1~3 layers, and the winding balance angle is 53~56°;

the intermediate rubber layer is extruded by means of an extruder with a thickness of 0.3~0.6 mm.

As a preferred scheme of a method for manufacturing a bulletproof and explosion-proof tubeless tire, the braiding balance angle refers to the complementary angle of the angle between the braided steel wire and the tire crown line.

As a preferred scheme of a method for manufacturing a bulletproof and explosion-proof tubeless tire, the winding balance angle refers to the complementary angle between the winding steel wire and the tire crown line.

As a preferred scheme of a method for manufacturing a bulletproof and explosion-proof tubeless tire, the tread slab base is provided with a tire pattern with a thickness of 10-20 mm.

As a preferred scheme of a method for manufacturing a bulletproof and explosion-proof tubeless tire, the thickness of tread slab base is 20~45% of the thickness of tire tread pattern.

As a preferred scheme of a method for manufacturing a bulletproof and explosion-proof tubeless tire, the belt is 2-4 layers, and its cord angle is designed to be 65~80°.

As a preferred scheme of a method for manufacturing a bulletproof and explosion-proof tubeless tire, the thickness of the innerliner (60) is 2~5 mm.

The advantageous effects of the invention: through the second stage forming process, the invention solves the problem that the explosion-proof layer is difficult to form due to the excessively hard metal material when making the embryo; in addition, the intermediate rubber layers can reduce the friction and heat generation problem between the steel wires and achieve the effect of prolonging the service life.

4. BRIEF DESCRIPTION OF ACCOMPANY DRAWINGS

As shown in the accompanying drawings: 10—tread slab base; 20—belt; 30—shoulder wedge; 40—carcass cord ply; 50—explosion-proof layer; 51—steel wire skeleton layer; 52—intermediate rubber layer; 60—innerliner; 70—bead.

5. SPECIFIC EMBODIMENT OF THE INVENTION

In order to make the above objects, features and advantages of the invention more clearly understood, the specific embodiments of the invention will be described in detail below with reference to the accompanying drawings.

Many specific details are set out in the following description in order to facilitate a full understanding of the invention, but the invention can also be implemented in other ways different from those described herein, and those skilled in the art can make similar promotions without departing from the connotation of the invention, therefore, the invention is not limited by the specific embodiments disclosed below.

Secondly, the "one embodiment" or "embodiment" herein refers to a particular feature, structure, or characteristic that may be included in at least one embodiment of the invention. The words "in an embodiment" appearing in different places in this specification do not all refer to the same embodiment, nor are they separate or selectively mutually exclusive from other embodiments.

Figure 1:
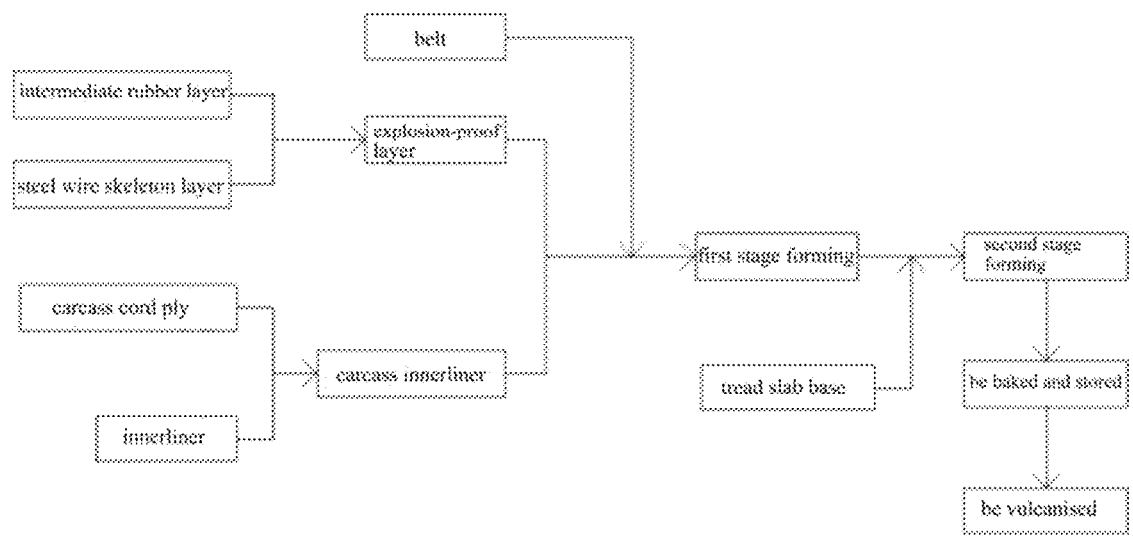
FIG. 1 is the process flow diagram of the invention.
Figure 2:
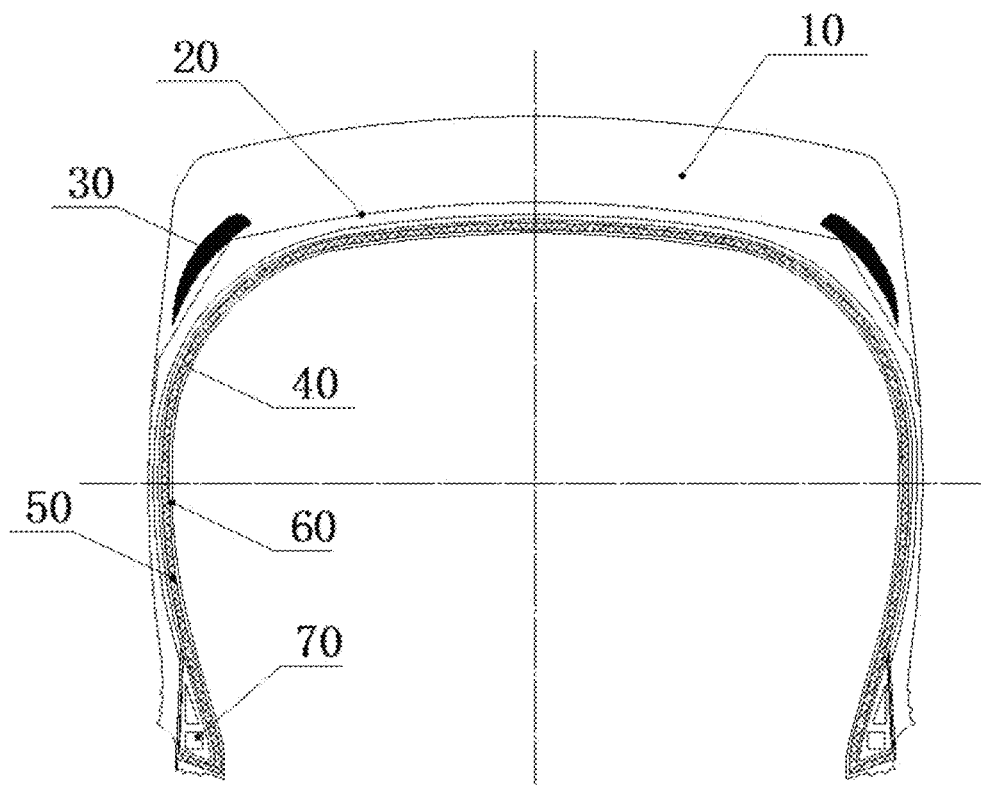
FIG. 2 is the schematic diagram of the structure of a bulletproof and explosion-proof tire.
Figure 3:
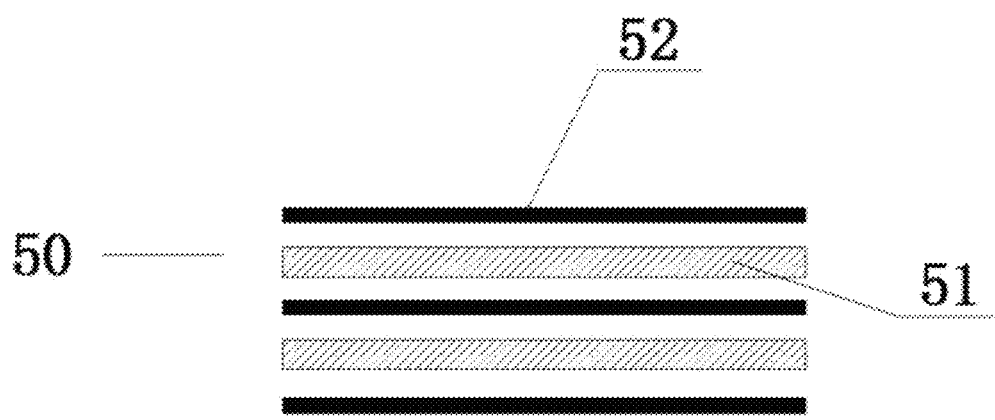
FIG. 3 is the schematic diagram of the structure of the explosion-proof layer.

Referring to FIG. 1-2, as the first embodiment of the invention, a method for manufacturing a bulletproof and explosion-proof tubeless tire is provided, first, the innerliner 60 is attached to the carcass cord ply 40 to make the carcass innerliner, and then the steel wire skeleton layers 51 and the intermediate rubber layers 52 are laminated to each other to make an explosion-proof layer 50, using a first stage building machine to complete the first stage forming of the carcass innerliner, explosion-proof layer 50 and belt 20 to obtain a semi-finished embryo, and then using a second stage building machine, the semi-finished embryo and the tread slab base 10 are formed in the second stage to obtain the embryo, which is baked and stored for 8~96 h and then vulcanised to obtain a bulletproof and explosion-proof tire;

the bulletproof and explosion-proof tire is sequentially provided with the innerliner 60, carcass cord ply 40, belt 20 and tread slab base 10 from the inside to the outside;

the shoulder of the bulletproof and explosion-proof tire is provided with shoulder wedges 30;

an explosion-proof layer 50 is arranged between the belt 20 and the carcass cord ply 40;

the explosion-proof layer 50 consists of a number of steel wire skeleton layers 51 and a number of intermediate rubber layers 52, both of which are interlaced with each other, and the ends of the explosion-proof layer 50 are all intermediate rubber layers 52;

the steel wire skeleton layers 51 are steel wire braided layers or steel wire winding layers;

the steel wire braided layer is braided by means of a steel wire braiding machine according to a certain braiding balance angle, the number of steel wire braiding layers is 1~3 layers, and the braiding balance angle is 53~56°;

the steel wire winding layer is woven by a steel wire winding machine according to a certain winding balance angle, the number of steel wire winding layers is 1~3 layers, and the winding balance angle is 53~56°;

the intermediate rubber layer 52 is extruded by means of an extruder with a thickness of 0.3~0.6 mm.

The braiding balance angle refers to the complementary angle of the angle between the braided steel wire and the tire crown line.

The winding balance angle refers to the complementary angle between the winding steel wire and the tire crown line.

Specifically, the explosion-proof layer 50 has high strength and high density, and can play an explosion-proof role, it is generally designed with 1~3 layers, mainly consisting of intermediate rubber layers 52 and steel wire skeleton layers 51. If the steel wire skeleton layer 51 is 1 layer, the intermediate rubber layer 52 is designed with 2 layers; if the steel wire skeleton layer 51 is 2 layers, the intermediate rubber layer 52 is designed with 3 layers; if the steel wire skeleton layer 51 is 3 layers, the intermediate rubber layer 52 is designed with 4 layers. By analogy, the number of layers of the intermediate rubber layer 52 is increased by one layer than the number of layers of the steel wire skeleton layer 51.

The tread slab base 10 is provided with a tire pattern with a thickness of 10-20 mm.

Specifically, different patterns are designed according to the usage scenarios of explosion-proof tires, road conditions and vehicles, and the patterns can be designed as longitudinal patterns, transverse patterns or mixed patterns as required.

The thickness of tread slab base 10 is 20~45% of the thickness of tire tread pattern.

Specifically, the tread slab base 10 is located at the root of the tire pattern, and is used to protect the pattern and the carcass, and the thickness can be designed according to tires of different specifications.

The belt 20 is 2-4 layers, and its cord angle is designed to be 65~80°.

Specifically, the belt 20 plays the role of tightening the carcass, and is the main strength bearing component of the tire, generally, steel cords with high strength, high modulus and small angle arrangement are used as their reinforcing materials, and the steel wires are covered with high modulus and high hardness rubber compound.

The thickness of the innerliner 60 is 2~5 mm.

Specifically, the bulletproof and explosion-proof tire is provided with a 2~5 mm innerliner in the tire, and butyl rubber, chlorobutyl rubber, etc. with better air tightness can be used.

The bulletproof and explosion-proof tire also includes a bead, and the bead is composed of the steel wire braided layer, the carcass cord ply, the bead rubber, the apex, and the bead ring.

It should be noted that the above embodiments are only used to illustrate the technical schemes of the invention and not to limit them, although the invention has been described in detail with reference to the preferred embodiments, it should be understood by those skilled in the art that the technical schemes of the invention can be modified or equivalently replaced without departing from the spirit and scope of the technical schemes of the invention, which should all be included in the scope of the claims of the invention.

The invention claimed is:

1. A method for manufacturing a bulletproof and explosion-proof tubeless tire;

first, an innerliner (60) is attached to a carcass cord ply (40) to make a carcass innerliner, and then steel wire skeleton layers (51) and intermediate rubber layers (52) are laminated to each other to make an explosion-proof layer (50), using a first stage building machine to complete the first stage forming of the carcass innerliner, the explosion-proof layer (50) and a belt (20) to obtain a semi-finished embryo, and then using a second stage building machine, the semi-finished embryo and the tread slab base (10) are formed in the second stage to obtain an embryo, which is baked and stored for 8~96 h and then vulcanised to obtain a bulletproof and explosion-proof tire;

the bulletproof and explosion-proof tire is sequentially provided with the innerliner (60), carcass cord ply (40), belt (20) and tread slab base (10) from the inside to the outside;

the shoulder of the bulletproof and explosion-proof tire is provided with shoulder wedges (30);

an explosion-proof layer (50) is arranged between the belt (20) and the carcass cord ply (40);

the explosion-proof layer (50) consists of a number of steel wire skeleton layers (51) and a number of intermediate rubber layers (52), both of which are interlaced with each other, and the ends of the explosion-proof layer (50) are all intermediate rubber layers (52);

the steel wire skeleton layers (51) are steel wire braided layers or steel wire winding layers;

the steel wire braided layer is braided by means of a steel wire braiding machine according to a certain braiding balance angle, the number of steel wire braiding layers is 1~3 layers, and the braiding balance angle is 53~56°;

the steel wire winding layer is wound by a steel wire winding machine according to a certain winding balance angle, the number of steel wire winding layers is 1~3 layers, and the winding balance angle is 53~56°;

each intermediate rubber layer (52) is extruded by means of an extruder with a thickness of 0.3~0.6 mm.

2. The method for manufacturing a bulletproof and explosion-proof tubeless tire of claim 1, the braiding balance angle refers to the complementary angle of the angle between the braided steel wire and the tire crown line.

3. The method for manufacturing a bulletproof and explosion-proof tubeless tire of claim 1, the winding balance angle refers to the complementary angle between the winding steel wire and the tire crown line.

4. The method for manufacturing a bulletproof and explosion-proof tubeless tire of claim 1, the tread slab base (10) is provided with a tire pattern with a thickness of 10-20 mm.

5. The method for manufacturing a bulletproof and explosion-proof tubeless tire of claim 1, the thickness of tread slab base (10) is 20~45% of the thickness of tire tread pattern.

6. The method for manufacturing a bulletproof and explosion-proof tubeless tire of claim 1, the belt (20) is 2-4 layers, and its cord angle is designed to be 65~80°.

7. The method for manufacturing a bulletproof and explosion-proof tubeless tire of claim 1, the thickness of the innerliner (60) is 2~5 mm.

\* \* \* \* \*